United States Patent
Borden et al.

[15] 3,635,504
[45] Jan. 18, 1972

[54] HOSE SPLICE

[72] Inventors: Clarence W. Borden, Trenton; John R. Mills, Pennington, both of N.J.

[73] Assignee: Goodall Rubber Company, Trenton, N.J.

[22] Filed: Oct. 7, 1968

[21] Appl. No.: 765,588

[52] U.S. Cl. ...................285/260, 285/397, 285/DIG. 16, 156/294, 156/258, 156/304, 152/296, 156/303, 156/1, 156/158, 156/159

[51] Int. Cl. .........................................F16l 31/00

[58] Field of Search..................156/304, 294, 158, 159, 296, 156/303, 1; 285/223, 258, 370, 397, 398, 260, DIG. 16; 161/155; 138/120, 155, 177

[56] References Cited

UNITED STATES PATENTS

| | | | |
|---|---|---|---|
| 2,478,684 | 8/1949 | Brooks | 285/397 X |
| 2,412,271 | 12/1946 | Kercher | 285/397 X |
| 1,810,825 | 6/1931 | Furrer | 285/397 X |
| 2,786,264 | 3/1957 | Colombo | 156/158 X |
| 2,983,639 | 5/1961 | Jageman | 156/294 X |
| 3,035,958 | 5/1962 | Wilkins | 156/294 |
| 3,276,929 | 10/1966 | Ferch | 156/158 X |
| 3,329,271 | 7/1967 | Ward et al. | 156/296 X |

*Primary Examiner*—Carl D. Quarforth
*Assistant Examiner*—Stephen J. Lechert, Jr.
*Attorney*—Beveridge & De Grandi

[57] ABSTRACT

Two-hose sections are spliced together by cutting their ends diagonally; telescoping them over a fabric-reinforced uncured rubber sleeve; placing uncured rubber against the sleeve to fill a gap between the hose sections; bridging between the outer surfaces of the hose sections with a strip of uncured rubber; and, curing the uncured rubber elements while applying compressive forces thereto.

Preparatory cutting of the hose sections is guided by a template which also flattens the hose. The internal sleeve is formed on a mandrel which remains within the sleeve until it is ejected therefrom by fluid pressure at the completion of the splicing operation 7 Claims, 14 Drawing Figures

INVENTORS
CLARENCE W. BORDEN
JOHN R. MILLS

BY Browne, Schuyler & Beveridge
ATTORNEYS

FLUID PRESSURE APPLIED

INVENTORS
CLARENCE W. BORDEN
JOHN R. MILLS
BY
*Browne, Schuyler & Beveridge*
ATTORNEYS

HOSE SPLICE

BACKGROUND

This invention is directed to a hose splice and to a method making such a splice.

One field in which the invention finds particular utility is in the art of splicing rubber irrigation hoses. In many situations, these hoses are manipulated in the fields by dragging them on the ground and leading them around capstans. The hose is flattened when properly engaged with a capstan.

When an irrigation hose of this type is damaged, it is unsatisfactory to repair it by using a conventional rigid coupling, since this would prevent the hose from passing in proper fashion over the capstans. Therefore, when damage occurs, it has been customary to replace the entire hose and to cut the damaged hose into smaller sections which may be used for nonirrigational purposes. This, of course, adds considerably to the expense of crop irrigation.

In the past, some hose splices have involved simply a flexible sleeve which is telescoped into a pair of hose sections. This procedure is not satisfactory for repairing heavy-duty hoses which are subjected to the wear and abuse which normally accompanies crop irrigation operations.

Another technique used in the past is to build up many layers of materials on the outside of the hose at the location of the splice. This provides a relatively stiff area in the vicinity of the splice and, therefore, cannot be used satisfactorily for the repair of hoses which are designed to be flattened while in use.

SUMMARY

This invention involves a method and a hose splice wherein a pair of hose sections are placed over an internal sleeve, and a body of rubber lies between and is bonded to the ends of the hose sections. Preferably, the body of rubber extends over and is bonded to the outer surfaces of the hose sections.

Also, the invention is directed to a method whereby a mandrel which is used in making a hose splice is removed after the splice is completed by discharging it from the hose under the influence of fluid pressure.

Other features of the invention pertain to the splice wherein the end surfaces of the hose sections are angularly offset from the longitudinal axis of the hose; and, to the method of preparing the end surfaces by the use of a template held on the hose section by fasteners which are driven through the hose.

The object of the invention is to provide a simple but durable hose splice which is made by procedures which are quickly and easily performed with a minimum of equipment.

BRIEF DESCRIPTION OF A PREFERRED EMBODIMENT

As explained previously, the splice of this invention may be used when a hose has ruptured. In such circumstances, the damaged portion is cut from the hose which then will constitute two sections.

Figure 1:
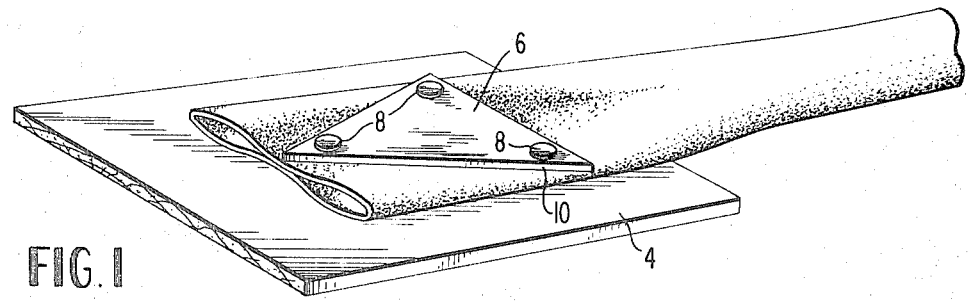
FIG. 1 shows an initial step of preparing one-hose section for the splicing operation, wherein a template is placed over the hose in order to guide a cutting operation.
Figure 2:
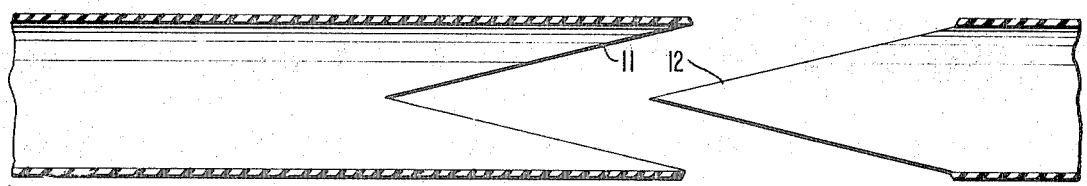
FIG. 2 shows the alignment and angular relationship between two-hose sections which have been prepared for splicing.
Figure 2A:
FIG. 2A is an enlarged sectional view of a portion of the hose shown in FIG. 2.

An initial step in preparing the terminal portion of each of the hose sections for the splicing operation is illustrated in FIG. 1. The hose 2 is placed on a board 4 and flattened beneath a template 6. Nails 8 are driven through the template, through the hose and into the board, thus maintaining the hose in a flat condition and fixing the template to the hose. Then, a knife or other cutting tool is drawn along the angular guide surfaces 10 of the template to cut entirely through the hose. This produces the two V-shaped cuts in each hose sections as illustrated in FIG. 2. In order to distribute the splice along the length of the hose, the angle between each of the guide surfaces and a longitudinal axis of the hose section preferably does not exceed 45°.

After the cutting operation, the ends of each hose section will appear as shown in FIG. 2 where there are axially projecting tapered fingers 12 which are located between and defined by the V-shaped cuts 11. The hose sections are so oriented that the tapered fingers 12 of one section will extend into the V-shaped cuts 11 in the mating section to create a pattern of chevrons extending around the hose.

Figure 3:
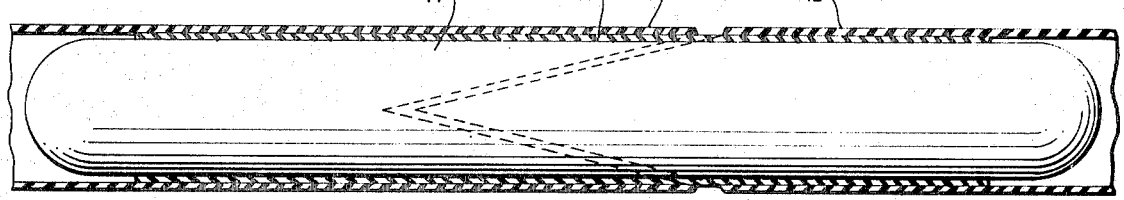
FIG. 3 shows the two-prepared hose sections when placed over a sleeve which is on a mandrel.

Referring to FIG. 3, it will be seen that the two-hose sections are then placed over a mandrel 14 which carries a sleeve. The spacing between the parallel surfaces of the two-hose sections may be three-sixteenths -inch. Bonding between the hose sections and the sleeve 16 is promoted by coating the contacting surfaces of all elements with a rubber cement prior to fitting the hose sections over the sleeve. Initial cleaning of the sleeve with a solvent may also be necessary. One suitable rubber cement is sold by United Shoe Machinery Company under the designation 4006–A.

Figure 3A:
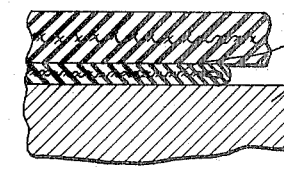
FIG. 3A is an enlarged sectional view of a portion of FIG. 3 showing the hose, sleeve and mandrel.
Figure 3B:
FIG. 3B is an enlarged view of a preferred form of sleeve used in connection with the invention.

The sleeve may be formed of a rubber such as that made and sold under the trademark Paracril Ozo, by Naugatuck Chemical of Naugatuck, Conn. and described in their revised Bulletin No. 219. This rubber composition is 30 percent polyvinyl chloride and 70 percent nitrile rubber. The sleeve, in its simplest form, may include a single layer of reinforcing material 18 as shown in FIG. 3A. However, it is preferred to use multiple layers of reinforcing material in the manner shown in FIG. 3B. Referring to FIG. 3B, it will be noted that the sleeve is formed of sheets 20 and 22 which may be of the same rubber composition described above. This sleeve is formed on the mandrel 14 illustrated in FIG. 3, and is not removed therefrom until completion of the splice. The sleeve of FIG. 3B is manufactured by first placing a sheet 20 of uncured rubber having a thickness of 0.030 inch around the mandrel 14. The tubular sheet 20 is then wrapped with a single ply 24 of tightly woven 14 ounce rayon fabric which has been impregnated and coated with rubber to render it impervious. The impregnated fabric 24 is a barrier which prevents the uncured lower layer 20 from striking through the additional layers of loosely woven reinforcing fabric. Three layers of loosely woven frictioned nylon fabric 26 are then placed over the barrier sheet 24 with their filler yarns extending circumferentially around the mandrel. This fabric has about seven filler yarns per inch and about 20 warp yarns per inch. It has a greater extensibility in the direction of the filler yarns to permit flattening of the spliced hose. Pieces 29 of polyvinyl chloride having a dimension of ¼ x ⅛ inch are placed at the ends of the fabric strips, and the end portions 28 of the sheet 20 are reversely bent over the pieces 29 to the position shown in FIG. 3B. The cover sheet 22 which has the same thickness and is made of the same materials as the layer 20 is then laid over to complete the sleeve.

The built up sleeve is wrapped in nylon tape under slight tension to provide uniformity in the outside diameter of the sleeve. The diameter may be checked for accuracy approximately 2 hours after the wrapping step. When completed, the sleeve should have an outside diameter which is at least one-thirty second -inch less than the inside diameters of the hose sections.

Figure 4:
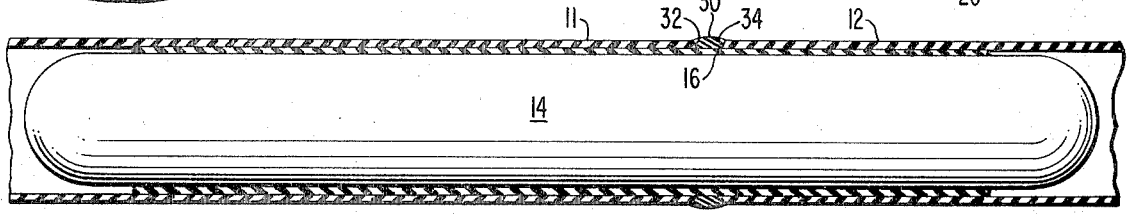
FIG. 4 is a view similar to FIG. 3 but showing a body of uncured rubber in the space between the ends of the two-hose sections.
Figure 4A:
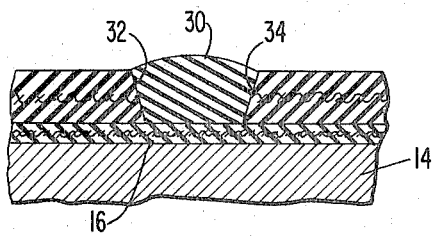
FIG. 4A is an enlarged view of a portion of FIG. 4.
Figure 5:
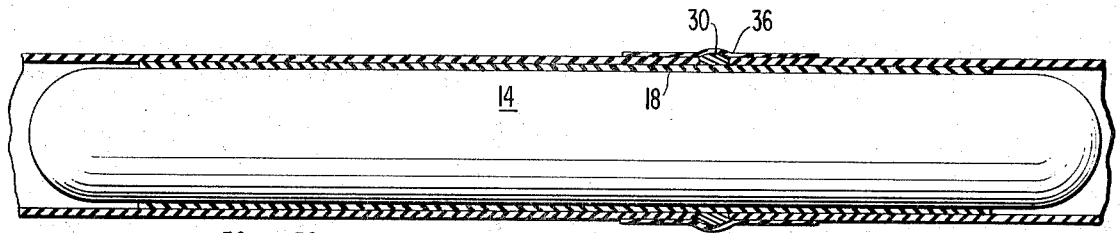
FIG. 5 is a sectional view showing the next step wherein a second body of uncured rubber is placed over the outside of the hose to bridge between the two-hose sections.
Figure 5A:
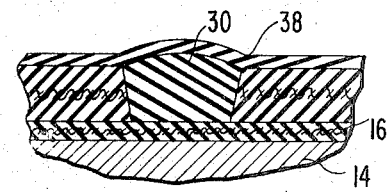
FIG. 5A is an enlarged view of the splice shown in FIG. 5.

Returning to the making of the splice itself, FIG. 4 shows the filling of the gap between the two-hose sections. A body 30 of uncured rubber is forced into intimate contact with the exposed surface of sleeve 16 and the cut end surfaces 32 and 34 of the hose sections. The material 30 may be of the same rubber composition described in connection with the sleeve in FIG. 3. As used throughout this specification, the term "rubber" is intended to encompass natural and synthetic organic polymers having elastomeric properties. During the application of the material 30, it is useful to employ a small roller which has a milled peripheral surface which is worked around the joint to force the uncured rubber into contact with the cut end surfaces 32 and 34 of the hose sections and with the exposed outer surface of the sleeve 16.

The next step in forming the splice involves the placement of a thin strip 36 of uncured rubber on the exterior surfaces of the hose sections in a position where it will bridge between the two-hose sections and overlie the body 30 of the uncured rubber. This strip 36 is 1 inch wide and 0.031 inch thick. If an air pocket occurs beneath the strip 36, it may be pricked slightly with an awl to release the entrapped air.

Throughout all of the foregoing steps, it is preferred to clean the contacting surfaces of adjacent rubber bodies of the hose sections and the elements 16, 30 and 36 with a methyl ethyl ketone solvent and then coat them with a conventional rubber cement which will promote their adhesion and improve the bond which occurs upon curing.

Figure 6:
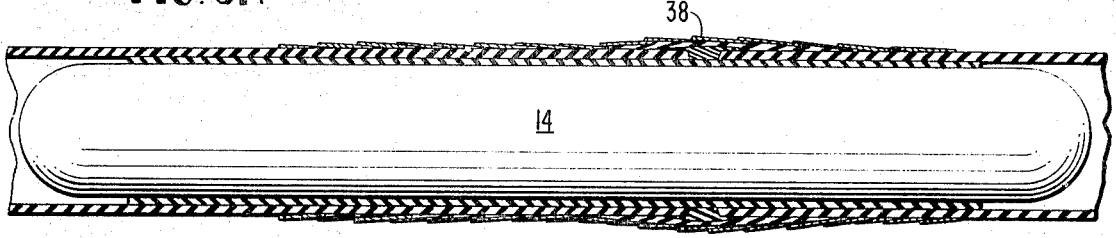
FIG. 6 shows a tape wrapped over the structure shown in FIG. 5 in order to compress the elements therewithin and produce a feathered edge in the outer body of uncured rubber.

Nylon wrapping tape 38 is wrapped around the spliced section of the hose as shown in FIG. 6. This wrapping operation brings the hose sections into intimate contact with the external surface of the uncured sleeve 16, applies compressive forces on the uncured bodies 30 and 36, and deforms the uncured rubber to provide a smooth contour to the upper surface of the body 36, feathering its edges so that they merge smoothly with the remainder of the external surface of the hose.

Heat is then applied to cure the rubber in the elements 18, 30 and 36, thus unifying the splicing elements to the two hose sections. One convenient manner of applying the curing or vulcanizing heat is to warp the hose with electrical heating tape which is capable of elevating the temperature of the spliced area to about 275° F. This temperature may be maintained for 1 ½ hours.

Figure 8:
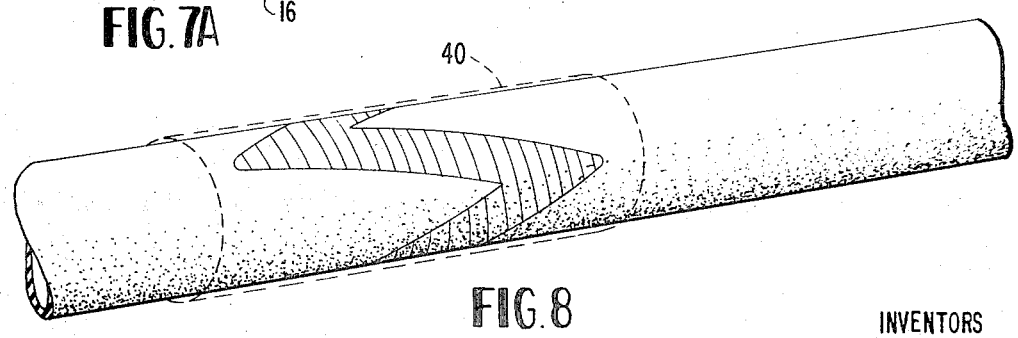
FIG. 8 is a perspective view of a hose which includes the improved splice of this invention.

After the rubber in the splice has cured, the heating tape and the nylon wrapping tape 38 are removed as shown in FIG. 8.

Figure 7:
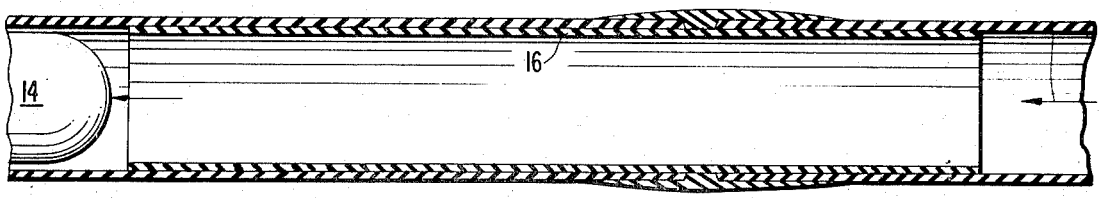
FIG. 7 illustrates the step of removing the mandrel from the hose by the application of fluid pressure.
Figure 7A:
FIG. 7A shows the completed splice of FIG. 7.

Removal of the mandrel is accomplished as shown in FIG. 7 by creating a pressure differential across the mandrel. Preferably, this is done by applying fluid under pressure to the interior of one end of the spliced hose. This simple procedure for ejecting the mandrel is convenient when splicing extremely long hose sections particularly when contrasted to the former practice of pulling the mandrel through the hose with a flexible rope or cable. When following the former practice with long hose sections, the preliminary insertion of the rope or cable through the hose is a complicated and inefficient operation.

The spliced hose, in its final condition, is shown in FIG. 8. The hose across the splice is strong, flexible and easily flattened. Its exterior surface is substantially smooth and has no pronounced irregularities which will result in snagging or localized wear.

In order to strengthen the spliced area, an external sleeve of uncured rubber may be placed over the spliced area and heated to a curing temperature in order to unite it securely to the exterior surface of both hose sections. The location of such an external sleeve is shown in broken lines at 40 in FIG. 8.

Those who are skilled in the art of hose manufacture and repair will appreciate that the invention may be practiced using materials and procedures which differ from those disclosed above. Accordingly, this invention and the protection afforded hereby are not limited only to the described embodiment but are deemed to encompass all variations thereto which fall within the terms and spirit of the following claims.

We claim:

1. A spliced hose comprising a pair of spaced apart and axially aligned hose sections, a sleeve having its outer surface bonded to the internal walls of both said hose sections, and a body of rubber bonded to the outer surface of the sleeve and to both of said hose sections.

2. A spliced hose according to claim 1 wherein each of the hose sections includes a reinforcing fabric, and the sleeve has a reinforcing fabric at least in those areas which bridge the space between the hose sections.

3. A spliced hose according to claim 1 wherein the rubber is bonded to the end surfaces of both hose sections and to the outer surfaces of both said hose sections.

4. A spliced hose according to claim 1 wherein at least portions of the end surface of each hose section lie at an angle no greater than 45° to the axis of the hose.

5. A spliced hose according to claim 4 wherein the end surface of each said hose section is shaped to form a pair of axially pointing tapered fingers.

6. A spliced hose according to claim 1 wherein the sleeve comprises an elastomeric body having internal reinforcements, said reinforcements including a barrier sheet and at least one loosely woven layer surrounding the barrier sheet.

7. A spliced hose according to claim 6 wherein the loosely woven layer is oriented so that its filler yarns extend circumferentially.

* * * * *